(12) United States Patent
Kumar et al.

(10) Patent No.: US 8,346,952 B2
(45) Date of Patent: Jan. 1, 2013

(54) DE-CENTRALIZATION OF GROUP ADMINISTRATION AUTHORITY WITHIN A NETWORK STORAGE ARCHITECTURE

(75) Inventors: Kartik Kumar, Bangalore (IN); James Hartwell Holl, II, Los Gatos, CA (US); Anshu Surana, Bangalore (IN); Ravindra Kumar, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 1123 days.

(21) Appl. No.: 11/963,646

(22) Filed: Dec. 21, 2007

(65) Prior Publication Data

US 2009/0055901 A1    Feb. 26, 2009

(30) Foreign Application Priority Data

Aug. 23, 2007   (IN) ............................ 1885/CHE/2007

(51) Int. Cl.
  *G06F 15/16* (2006.01)
(52) U.S. Cl. ................... 709/229; 726/1; 726/2; 726/4; 726/5; 726/6; 726/15; 709/226; 715/741; 707/785; 711/147; 711/154; 711/163; 711/100
(58) Field of Classification Search ..................... 726/4
  See application file for complete search history.

(56) References Cited

U.S. PATENT DOCUMENTS

| | | | |
|---|---|---|---|
| 5,819,292 A | 10/1998 | Hitz et al. | |
| 5,963,962 A | 10/1999 | Hitz et al. | |
| 6,289,356 B1 | 9/2001 | Hitz et al. | |
| 6,408,336 B1* | 6/2002 | Schneider et al. | 709/229 |
| 7,194,541 B1* | 3/2007 | Ravindranath et al. | 709/225 |
| 7,409,494 B2 | 8/2008 | Edwards et al. | |
| 8,209,495 B2* | 6/2012 | Yagi et al. | 711/147 |
| 2002/0184120 A1* | 12/2002 | Suzuki et al. | 705/30 |
| 2003/0018786 A1* | 1/2003 | Lortz | 709/226 |
| 2004/0030668 A1 | 2/2004 | Pawlowski et al. | |
| 2005/0246382 A1 | 11/2005 | Edwards | |
| 2006/0259637 A1 | 11/2006 | Yadav et al. | |
| 2008/0195624 A1* | 8/2008 | Ponnappan et al. | 707/9 |

* cited by examiner

*Primary Examiner* — Nathan Flynn
*Assistant Examiner* — Bryan Wright
(74) *Attorney, Agent, or Firm* — Perkins Coie LLP

(57) ABSTRACT

An embodiment of a network manager permits a resource group administrator (with resource group level permissions but without global permissions) to add a global object to his/her resource group as a managed object, without requiring the administrator to have a global permission, as discussed further below. An embodiment of the network manager permits a resource group administrator to also edit the configuration settings that are attached to his/her resource group without requiring the administrator to have a global permission.

31 Claims, 4 Drawing Sheets

DE-CENTRALIZATION OF GROUP ADMINISTRATION AUTHORITY WITHIN A NETWORK STORAGE ARCHITECTURE

TECHNICAL FIELD

Embodiments of the invention relate generally to an apparatus and method for de-centralization of group administration authority.

BACKGROUND

For purposes of providing security in a network system, various methods may be used to restrict the access of a network administrator (or other users of the network system) to a particular network resource (or network resources) in the network system. Network resources in a network system include, for example, storage appliances (e.g., filer products which are commercially available from NETWORK APPLIANCE, INCORPORATED or other types of file servers or computing devices used for data storage), network caches (e.g., NetCache® products which are commercially available from NETWORK APPLIANCE, INCORPORATED), or aggregates, volumes, or qtrees in a storage appliance, or other suitable types of network resources that are known to those skilled in the art. Additional details on examples of aggregates, volumes, and qtrees are discussed in, for example, commonly-assigned U.S. patent application Ser. No. 10/836,817. An aggregate is formed by one or more groups of disks, such as RAID groups, for storing data. A volume will also store data, and is analogous to a file within an aggregate. A volume consumes storage space that is physically smaller than (or equal to) the size of the storage space consumed by the aggregate. A qtree is a data management entity for also storing data in a volume and is smaller in storage size than a volume.

As known to those skilled in the art, role based access control (RBAC) methods may be used to permit and prevent a user to access a particular network resource(s) based upon a role of the user. One example of a product that use RBAC to control the access of users to network resources is the DataFabric Manager®, which is a network management product that is commercially available from NETWORK APPLIANCE, INCORPORATED. Other RBAC based products are commercially available from various vendors. As an example, a user may be assigned the role of "global administrator" or "resource group administrator". A global administrator is permitted to access and to modify configuration settings (i.e., has an access permission) in all network resources (e.g., storage appliances) that are known or/and are discovered in the network system by a network management product. This type of broad access permission for the global administrator is also known as a "global permission". An example of a configuration setting may be a domain name server (DNS) name for a storage appliance in the network system. In contrast, a resource group administrator has an access permission to only a subset of the network resources (e.g., storage appliances) that are known or/and are discovered in the network system by a network management product. For example, a resource group administrator may have access permission in storage appliances that are located in a first location and may not have access permission in storage appliances that are located in a second location, while a global administrator has access permission in storage appliances in both the first and second locations. This type of a more limited access permission (as compared to the "global permission") for the resource group administrator is known as a "resource group level permission".

The set of network resources that provide access permissions to a global administrator can be represented as global objects that are grouped in a user-created group of objects (i.e., "global group"). These global objects in the global group are data structures that represent the network resources which can be accessed by the global administrator. The global administrator can also add new global objects to the global group, where a new global object represents a newly-discovered network resource that has been discovered in the network system by a network management product. The global administrator has the above-mentioned "global permission" which permits the global administrator to access to these global objects in order to change the configuration settings of network resources that correspond to these global objects. The global permission also permits the global administrator to add the above-discussed new global objects to the global group.

The network resources that provide an access ability to a resource group administrator can be represented as managed objects that are grouped in a user-created group of objects (i.e., "resource group"). The managed objects are data structures that represent the network resources (e.g., storage appliances) that provide access permissions to a resource group administrator. A resource group can attach a global object in the global group to a particular resource group based on a selected criteria such as, for example, the physical location, ownership, and/or configuration of the network resource that is represented by the global object. When the global object is attached to the particular resource group, the global object also becomes a managed object in the particular resource group for access by the resource group administrator. When the resource group administrator attaches a global object to his/her resource group (so that the global object is also now a managed object in his/her resource group), that resource group administrator will be able to change the configuration settings (e.g., domain name server name) of that managed object. These changed configuration settings are then pushed (i.e., transmitted) by a network management product to the network resource that is associated with that managed object, and these changed configuration settings will be implemented in that network resource.

The resource group administrator has the above-mentioned "resource group level permission" which permits the resource group administrator to access to the managed objects in a resource group(s) if the resource group administrator owns (i.e., has access permissions to) the resource group(s). An access operation that is allowed for a resource group administrator include, but are not limited to, for example, the ability for a resource group administrator to change configuration settings (e.g., domain name server names or other parameters) in each network resource in the resource group.

In previous methods, a resource group administrator has access permissions on managed objects in his/her resource group(s). Such access permissions to the resource group permit the resource group administrator to perform particular operations such as, for example, adding managed objects to their resource group(s) (by attaching a global object to his/her resource group(s)), and editing configurations that are attached to his/her resource group. For purposes of network security, the resource group administrator does not have an access permission to managed objects in a resource group that does not belong to the resource group administrator.

However, allowing a resource group administrator to add managed objects to his/her resource group introduces the ability of the resource group administrator to add (i.e., attach) a global object of a network resource (e.g., storage appliance), in which he/she does not have any access permissions over, to his/her resource group. As a result of adding that global object to his/her resource group, that global object also becomes a managed object in his/her resource group. As a result, the resource group administrator improperly gains the ability to perform all of the access operations on the network resource that is represented by that managed object.

On the other hand, suppose that a resource group administrator has a legitimate access permission to a particular network resource (e.g., storage appliance). If that resource group administrator is not permitted to add a global object for that particular network resource as a managed object into his/her resource group(s), then the resource group administrator is subject to inconvenience and even be hindered in the work tasks of managing his/her resource group(s) because he/she will not be able to access that particular network resource. In order for the resource group administrator to add that global object as a managed object in his/her particular resource group(s), that resource group administrator is inconveniently required to request the global administrator to add that global object as a managed object in the particular resource group(s). Therefore, there is a need for a new approach that will permit a resource group administrator (with a "resource group level permission" but without a "global permission") to add managed objects to his/her resource group without requiring a global permission.

As also discussed below in further detail, there is also a need for a new approach that will permit a resource group administrator (with a resource group level permission but without a global permission) to edit the configurations that are attached to his/her resource group(s) without requiring a global permission.

SUMMARY OF EMBODIMENTS OF THE INVENTION

As discussed below in additional details, an embodiment of the invention provides a network manager that solves the above-discussed disadvantages of previous approaches. As also discussed above, a server administrator with the above-mentioned resource group level permission is known as a "resource group administrator". An embodiment of the network manager permits a resource group administrator (with the above-mentioned "resource group level permissions" but without the above-mentioned "global permissions") to add a global object to his/her resource group as a managed object, without requiring the server administrator to have a global permission, as discussed further below. An embodiment of the network manager permits a resource group administrator to also edit the configuration settings that are attached to his/her resource group without requiring the server administrator to have a global permission, as discussed further below.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Figure 1:
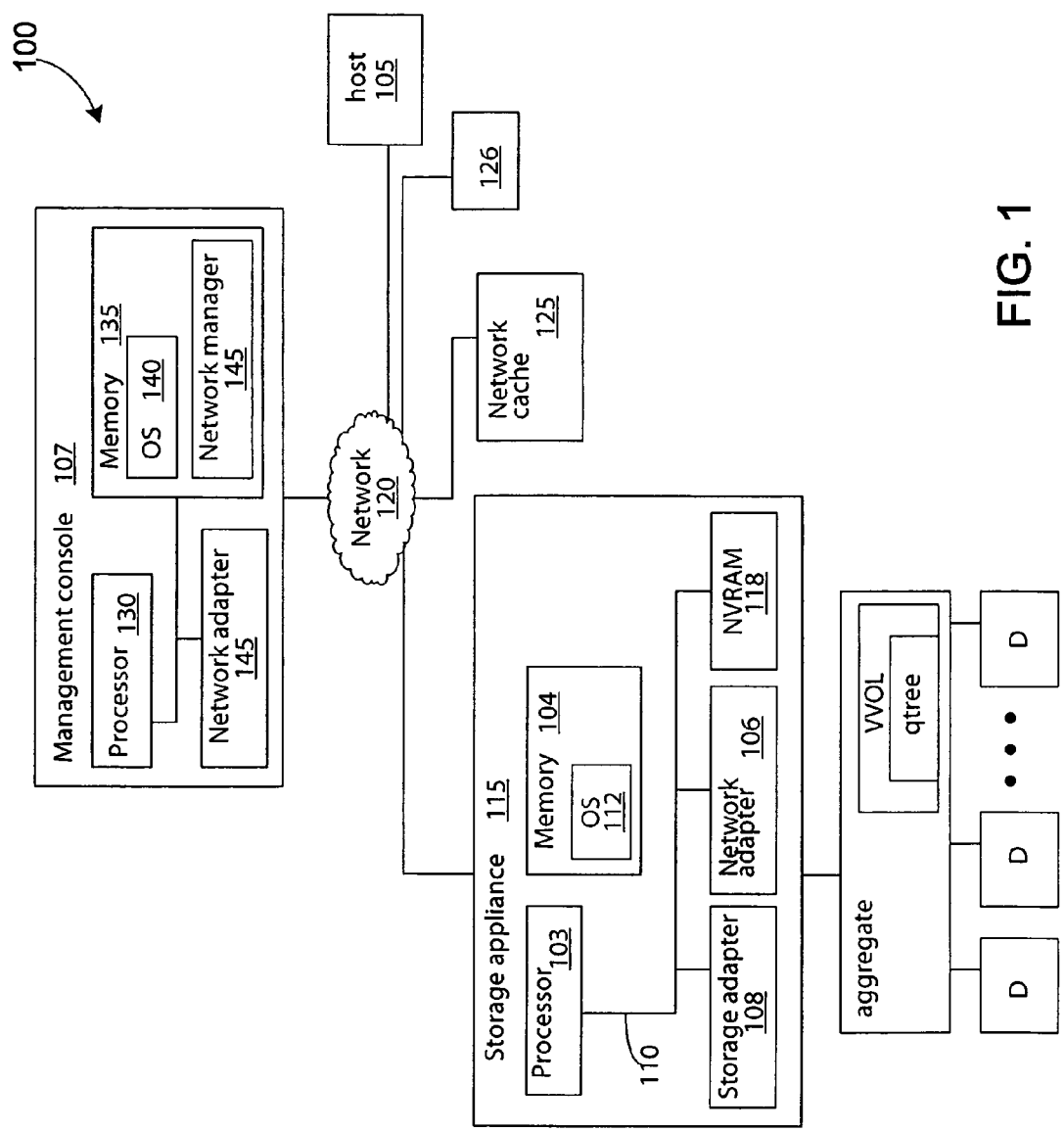
FIG. 1 is a block diagram of a system (apparatus), in accordance with an embodiment of the invention.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

An embodiment of the invention advantageously allows a resource group administrator, who has an access permission to a network resource (e.g., storage appliance, network cache, or other network device), to be allowed to access that network resource when that network resource is added to his/her resource group. When the network resource is added to the resource group of the resource group administrator, a global administrator, with a "global permission", adds an object of the network resource to global objects. If a "resource group level permission" of the resource group administrator matches a stored permission in the network resource, then the resource group administrator can add a copy of the object of the network resource from the global objects to the managed objects belonging to the resource group administrator. Since a copy of that object is added to the managed objects, the resource group administrator (who owns the resource group) can then access that network resource and/or change configuration settings in that network resource. The above authentication of the resource group level permission of the resource group administrator allows the resource group administrator to add, to his/her managed objects, an object that represents a network resource that the resource group administrator is permitted to access and eliminates the burden on global administrators of performing the adding of objects in the managed objects of resource group administrators.

As also discussed below in additional details, an embodiment of the invention provides a network manager that solves the above-discussed disadvantages of previous approaches. As also discussed above, a server administrator with the above-mentioned resource group level permission is known as a "resource group administrator". An embodiment of the network manager permits a resource group administrator (with the above-mentioned resource group level permissions but without the above-mentioned global permissions) to add a global object to his/her resource group as a managed object, without requiring the server administrator to have a global permission, as discussed further below. An embodiment of the network manager permits a resource group administrator to also edit the configuration settings that are attached to his/her resource group without requiring the server administrator to have a global permission, as discussed further below.

FIG. 1 is a block diagram of a system (apparatus) 100, in accordance with an embodiment of the invention. The system 100 includes one or more host devices 105, a management console 107, and one or more network resources such as, for example, one or more storage appliances 115, a network cache 125, and/or other types of network resources. As another example, a network resource can be a network device 126 with storage capability such as, for example a router with storage capability or a network switch with storage capability. For purposes of clarity, only one host device 105, one network device 126, and one storage appliance 115 are shown in the example of FIG. 1. The elements in the system 100 can communicate via a network 120 which may be, for example, a local area network (LAN), a wide area network (WAN), virtual private network (VPN), a combination of LAN, WAN and VPM implementations, or another suitable communication network.

Each of the devices in the system 100 typically includes an appropriate conventional network interface arrangement (not shown) for communicating over the network 120 using a desired communication protocol such as, for example, Transport Control Protocol/Internet Protocol (TCP/IP), User Datagram Protocol (UDP), Hypertext Transfer Protocol (HTTP), Simple Network Management Protocol (SNMP), or other suitable protocols.

A storage appliance 115 is a computer that provides file service relating to the organization or storage of information on storage devices, such as disks. Examples of currently available storage appliance products and associated software components are commercially available from, for example, NETWORK APPLIANCE, INC., Sunnyvale, Calif. or other vendors. Additional details of an example storage appliance are also disclosed in, for example, commonly-assigned U.S. patent application Ser. No. 10/215,917. In addition, it will be understood to those skilled in the art that the embodiments of the invention described herein may also apply to any type of special-purpose computer (e.g., server) or general-purpose computer, including a stand-alone computer, embodied as a storage appliance or file server. Moreover, the teachings of the embodiments of the invention can also be adapted to a variety of file server architectures including, but not limited to, a network-attached storage environment, or a storage area network and disk assembly directly-attached to a client/host computer. The term "storage appliance" or "file server" or "filer" should therefore be taken broadly to include such arrangements.

The storage appliance 115 includes a processor 103, a memory 104, a network adapter 106, and a storage adapter 108 interconnected by a system bus 110. The storage appliance 115 also includes a storage operating system 112 that implements a file system to logically organize the information as a hierarchical structure of directories and files on a disk. Additionally, a persistent storage device 118 such as, for example, a non-volatile RAM (NVRAM) 118 is also typically connected to the system bus 110. Although NVRAMs are shown in FIG. 1, any suitable persistent storage device that retains content in the event of a power failure or other system failure can be used in place of the NVRAMs. An example of a suitable persistent storage device is a battery-backed RAM, although other suitable storage devices may also be used.

In an illustrative embodiment, the memory 104 may have storage locations that are addressable by the processor 103 for storing software program code or data structures for use in the functions of the storage appliance 115. The processor 103 and adapters 106 and 108 may, in turn, include processing elements and/or logic circuitry configured to execute the software code and manipulate the data structures.

The storage operating system 112, portions of which are typically resident in memory 104 and executed by the processing elements, functionally organizes a storage appliance by inter-alia invoking storage operations in support of the file services that are implemented by the storage appliance. It will be apparent by those skilled in the art that other processing and memory implementations, including various computer readable media may be used for storing and executing program instructions pertaining to the inventive techniques described herein.

The network adapter 106 includes the mechanical, electrical, and signaling circuitry for connecting the storage appliance 115 to a host 105 over the computer network 120 or connecting the storage appliance 115 to other storage appliance(s). A host 105 can be a general-purpose computer configured to execute applications including file system protocols such as, for example, the Network File System (NFS) or the Common Internet File System (CIFS) protocol or other suitable protocols. Moreover, the host 105 can interact with the storage appliance 115 in accordance with the known client/server model of information delivery.

The storage adapter 108 cooperates with the storage operating system 112 in order to access information requested by the host 105. Each storage volume is constructed from an array of physical disks D that are typically organized as RAID disk groups. The RAID disk groups include independent physical disks including those storing a striped data and those storing separate parity data. The number of disks in a storage volume and in a RAID disk group may vary.

The storage adapter 108 includes input/output interface circuitry that couples to the disks over an I/O interconnect arrangement such as, for example, a conventional high-speed/high-performance fibre channel serial link topology. The information is retrieved by the storage adapter 108, and may be processed by the processor 103 (or the adapter 108 itself) prior to being forwarded over the system bus 110 to the network adapter 106, where the information is formatted into a packet and returned to the host 105.

To facilitate access to the disks, the storage operating system 112 typically implements a file system that logically organizes the information as a hierarchical structure of directories in files on the disks. Each file on a disk may be implemented as a set of disk blocks configured to store information such as text or other format. The directory may be implemented as a formatted file in which other files and directories are stored. The storage operating system 112 associated with each of the above-mentioned storage volume is, for example, the Data ONTAP® storage operating system which is commercially available from NETWORK APPLIANCE, INC. Additional details of an example storage operating system 112 are disclosed in, for example, commonly-assigned U.S. patent application Ser. No. 10/836,090, which is hereby fully incorporated herein by reference. The Data ONTAP storage operating system implements a Write Anywhere File Layout (WAFL)® file system. However, it is expressly contemplated that the principles of embodiments of this invention can be implemented using a variety of alternate storage operating system architectures. The WAFL file system is also disclosed in, for example, commonly-assigned U.S. Pat. Nos. 6,289,356, 5,963,962, and 5,819,292, all of which are hereby fully incorporated herein by reference.

The network cache 125 can store data that is also stored in the storage appliance 115 and transmitted to a requesting host 105. Additional details of an example network cache 125 are disclosed in, for example, commonly-assigned U.S. patent application Ser. No. 11/228,689, which is hereby fully incorporated herein by reference. An example network cache is the NetCache® product which is commercially-available from Network Appliance, Inc.

The management console 107 is also connected to the network 120 and can communicate with the host 105 and with network resources such as, for example, the storage appliance 115 and network cache 125, by use of known network communication protocols. The management console 107 is typically, for example, a standard computer or other computing device that can perform the various computing operations that are discussed below in additional details. Typically, the management console 107 will include a processor 130, memory 135, operating system 140, and network adapter 145. The operating system 140 can be a standard operating system for computing devices such as, for example, the LINUX® operating system, a WINDOWS® type operating system, or other known suitable operating systems. A network manager 145 can operate over the OS 140 and is discussed below in additional details.

Figure 2:
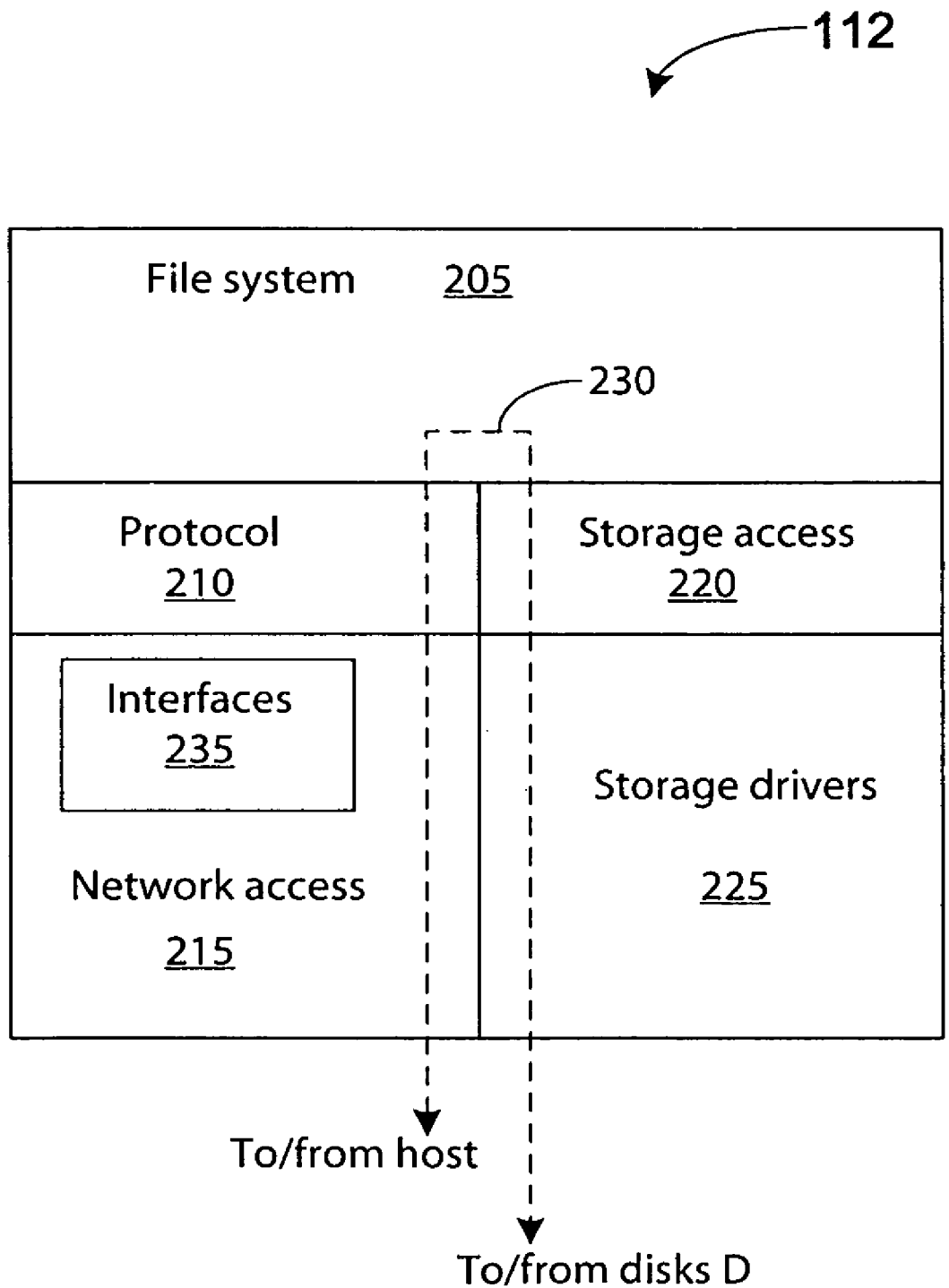
FIG. 2 is a block diagram of an example storage operating system in a storage appliance that can be used in the system of FIG. 1.

FIG. 2 is a block diagram of an example storage operating system 112 in a storage appliance 115 that can be used in the system of FIG. 1. As shown, a storage operating system 112 includes several modules, or "layers". These layers include a file system 205. The file system 205 is application-layer software that keeps track of the directory structure (hierarchy) of the data stored in a storage subsystem and manages read/write operations on the data (i.e., executes read/write operations on the disks in response to client requests). The operating system 112 also includes a protocol layer 210 and an associated network access layer 215, to allow a storage appliance to communicate to devices in a network, such as the host 105. The protocol 210 layer implements one or more of various higher-level network protocols, such as, for example, Network File System (NFS), Common Internet File System (CIFS), Hypertext Transfer Protocol (HTTP) and/or Transmission Control Protocol/Internet Protocol (TCP/IP), which are network protocols that are known to those skilled in the art. The network access layer 215 includes one or more drivers that implement one or more lower-level protocols to communicate over the network, such as Ethernet. The network access layer 215 may incorporate one or more interfaces 235 that receive input commands from a user.

The storage operating system 112 also includes a storage access layer 220 and an associated storage driver layer 225, to allow a storage appliance to communicate with a storage subsystem. The storage access layer 220 implements a higher-level disk storage protocol, such as, e.g., RAID, while the storage driver layer 225 implements a lower-level storage device access protocol, such as, e.g., Fibre Channel Protocol (FCP) or SCSI, which are protocols that are known to those skilled in the art. Also shown in FIG. 2 is path 230 which represents the data flow through the storage operating system 112 associated with a read or write operation. Additional details of an example storage operating system 112 are described in the above-mentioned commonly-assigned U.S. patent application Ser. No. 10/836,090.

As used herein, the term "storage operating system" generally refers to the computer-executable code operable to perform a storage function in a storage appliance, e.g., that manages data access and may, in the case of a file server, implement file system semantics. In this sense, the Data ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage appliance 115. An example of a multi-protocol storage appliance that may be advantageously used with the present invention is described in commonly-assigned U.S. patent application Ser. No. 10/215,917. Moreover, the teachings of this invention can be adapted to a variety of storage appliance architectures or storage system architectures including, but not limited to, a network-attached storage environment, a storage area network and disk assembly directly-attached to a client or host computer. The term "storage appliance" should therefore be taken broadly to include such arrangements in addition to any subsystems configured to perform a storage function and associated with other equipment or systems.

Figure 3:
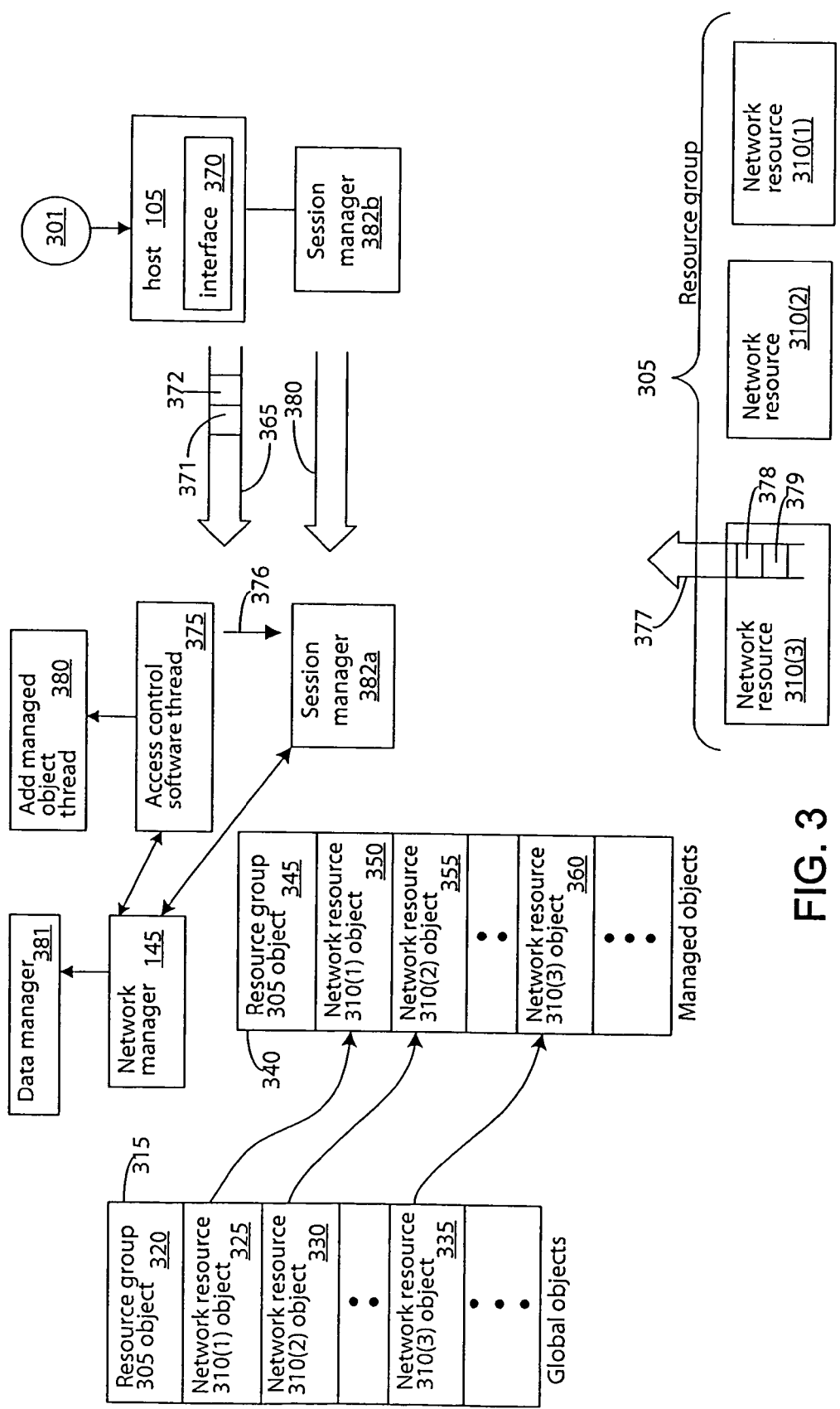
FIG. 3 is a block diagram that shows additional details of an embodiment of the invention.

FIG. 3 is a block diagram that shows additional details of an embodiment of the invention. As an example, assume that a resource group administrator 301 owns (i.e., has access permissions to) the resource group 305. A resource group administrator can own one or more resource groups. In the example of FIG. 3, the resource group 305 includes at least one network resources which can be, for example, storage appliances, network caches, or other devices in a network such as, for example, routers with storage capability or network switches with storage capability. Network resources may also include, for example, aggregates, volumes, or qtrees in a storage appliance. The additional details on aggregates, volumes, or qtrees have been previously discussed above in the background section. An example of a storage appliance and a network cache is shown in FIG. 1. Access permission give the administrator an ability to perform access operations such as, but not limited to, for example, the ability for a resource group administrator to change configuration settings (e.g., domain name server names or other parameters) in each network resource in the resource group. In the example of FIG. 3, the network resource 305 includes the network resources 310(1) and 310(2).

Assume that the resource group administrator (or other suitable personnel) adds a new network resource 310(3) to the resource group 305. Since the network resource 310(3) is added to the resource group 305, it is proper that the resource group administrator is to be given an ability to access this network resource 310(3) that has been added to his/her resource group 305. As an example, the network resources 310(1) through 310((3) may be storage appliances that are located in the same location (e.g., same building) or belong to a same department (e.g., engineering or marketing) in an organization. Other criteria may be used for including a particular network resource in a resource group.

In an embodiment of the invention, the network manager 145 (in the management console 107 in FIG. 1) maintains a table 315 that is typically stored in the memory 135 (FIG. 1). Note that in other embodiments of the invention, the network manager 145 and the tables shown in FIG. 3 can be implemented in the host 105 itself. The table 315 determines the network resources that belong in a resource group. For example, object 320 contains the data structure that represents the resource group 305. Object 325 contains the data structure that represents the network resource 310(1) and object 330 contains the data structure that represents the network resource 310(2). Since the data structures of network resources 310(1) and 310(2) are in the same table 315 with the data structure of resource group 320, the network manager 145 determines that the network resources 310(1) and 310(2) both belong to the network resource 310(3).

The table 315 can be implemented by standard data structure formats that are well known to those skilled in the art. For example, the table 315 can represent a linked list or a stack that can group or categorize a set of data structures. Other known types of data structure formats may be used to group the objects 320-335 together and are not discussed herein for purposes of brevity.

In the above example, after the above-discussed network resource 310(3) has been added to the resource group 305, the data structure that represents the added network resource 310(3) is added as object 335 among the global objects set in the table 315. This object 335 can be added directly in table 315 by a suitable personnel (e.g., the above-mentioned global administrator who has the "global permission" that was discussed above in the background section). A data manager 381 (which is a standard data management program) may be used to add the objects in the table 315. For example, various types of data managers are commercially available to permit objects to be added to linked lists or stacks or for duplicating the objects. Alternatively or additionally, the network manager 145 can perform known network device discovery methods to discover the added network resource 310(3) and then add the object 335 that represents the discovered network resource 310(3). The above-mentioned functions of the data manager 381 are performed by, for example, the above-mentioned DataFabric Manager® which is commercially available from Network Appliance, Incorporated.

The objects in the table 315 are known as "global objects" because the above-discussed global administrator (as discussed in the above background discussion) can add these objects to and modify these objects in the table 315. The tables 315 and 340 and network manager 145 are typically implemented in the management console 107 (FIG. 1).

The above-discussed resource group administrator 301 can access and change the configurations settings of network resources in the resource group 305. The table 340 determines the network resources that are included in a resource group. For example, the object 345 represents the resource group 305, and the objects 350 and 355 represent the network resources 310(1) and 310(2), respectively.

Since the objects 350 and 355 are grouped in table 340 with the object 345, the network resources 310(1) and 310(2) belong to the resource group 305.

The objects in the table 340 are known as "managed objects" set because the above-discussed resource group administrator 301 can add these objects to and modify these objects in the table 340.

If a network resource is in the table 340 as a managed object, then the resource group administrator 301 who owns the resource group 305 will be able to access and change the configuration settings in the network resources in his/her resource group 305. In order for the resource group administrator who owns the resource group 305 to be able to access the newly-added network resource 310(3), an object of the network resource 310(3) is required to be added in the table 340. Note that the objects 350 and 355 are added to the table 340 in a similar manner as discussed above for object 360.

In the above example, after the network resource 310(3) is added to the resource group 305 and after the object 335 of the network resource 310(3) is added as a global object in the table 315, the resource group administrator 301 (who owns the resource group 305) first provides a resource group level permission 365 which can be transmitted from an interface 370 of the host 105. As similarly discussed above in the background section, this resource group level permission is a more limited access permission than the global permission of a global administrator who can changed the settings and objects in the table 315. The interface 370 can be, for example, a command line interface (CLI) or the zephyr API (ZAPI) which is an application interface that is provided by Network Appliance Incorporated. The resource group level permission 365 includes, for example, a login name 371 and/or password 372 that are unique to the resource group administrator who owns the resource group 305.

An access control software thread 375 of the network manager 145 receives the permission 365 and transmits a query 376 to the network resource 310(3). The access control software thread 375 can be implemented by use of known software program languages (e.g., C or C++) and by use of known software programming techniques. In response to the query 376, the network resource 310(3) sends a response indicating the permission 377 that are stored in the network resource 310(3). The permission 377 is typically stored in a memory in the network resource 310(3) and the response with the permission 377 is transmitted to the network manager 145 by, for example, a processor 103 in the network resource 310(3) if the network resource 310(3) is a storage appliance 115 (FIG. 1) or a controller in the network resource 310(3) if the network resource 310(3) is a network cache 125 (FIG. 1). The permission 377 is unique to the resource group administrator who owns the resource group 305 and can also include a login name 378 and/or password 379.

The access control software thread 375 authenticates the permission 365 by making the comparisons of the permission 365 with the permission 377, as discussed above. In the case where the login name 371 and password 372 are required to be provided by the resource group administrator as a login/password pair to be authenticated by the thread 375, then this login/password pair is referred to as a "credential" that is authenticated by the thread, and is not referred to as a "permission". If the access control software thread 375 determines that there is a match between the permission 377 (stored in the network resource 310(3)) and the permission 365 provided from the host 105, then the permission 365 is successfully authenticated and the access control software thread 375 can then process an add managed object command 380 via interface 370 from the resource group administrator. In response to this command 380, the access control software thread 375 permits an add managed object software thread 380 to copy the global object 335 and add this copied object as a managed object 360 into the table 340. The table 340 forms that managed objects group that is owned by the resource group administrator 301. Therefore, other resource group administrators will have their own separate respective manage objects groups. Since this managed object 360 representing the network resource 310(3) is added to the table 340, the access control software thread 375 will permit the resource group administrator 301 (who owns the resource group 305) to now be able to access the network resource 310(3) and to change configuration settings in this network resource 310(3) as also discussed below in additional details. The thread 375 permits the administrator 301 to access the network resource 310(3) by forwarding all commands from the administrator 301 to the network resource 310(3) since the object 360 for the network resource 310(3) is now added to the table 340. The thread 375 identifies the commands from the administrator 301 based on, for example, the source address (e.g., host 105 address or identifier) in the commands. Methods and components for forwarding and blocking commands are known to those skilled in the art and are not discussed herein for purposes of brevity. Additionally, components used for transmitting commands have been discussed above with reference to FIG. 1.

Note that if the permissions 365 and 377 do not match, the access control software thread 375 will not permit a personnel to add a global object (e.g., object 335) as a managed object in the table 340. Therefore, the access control software thread 375 will block and will not process the add managed object command 380. As a result, the personnel will not be able to add a global object (e.g., object 335) into the table 340 as a managed object (e.g., object 360). A mismatch of the permissions 365 and 377 indicates that a personnel who is attempting to add the global object 335 as a managed object into the table 340 is not the proper resource group administrator of the newly added network resource 310(3) and should be prevented access to that network resource. Since the global object (e.g., object 335) is prevented in being added into the table 340 as a managed object (e.g., object 360), the thread 375 will block all commands from a resource group administrator who is not an owner of the network resource 310(3).

Alternatively, the permissions 365 and 377 are biometric information of the personnel 301. Biometric information include, for example, fingerprint, facial information, iris and/or retinal information, voice information, signature information, vascular pattern, DNA markings, and/or other types of biometrics of the resource group administrator 301. In this embodiment, the network manager 145 can use known biometrics authentication techniques that are known to those skilled in the art when comparing the permissions 365 and 377.

Note that the network manager 145 and the host 105 can include the standard session managers 382a and 382b, respectively, so that the administrator 301 does not have to re-input or re-type the login name 371 and password 372 prior to sending each command 380. The sessions managers 382a and 382b will establish a session between the management console 107 (FIG. 1) and host 105 so that the administrator is not required to re-input or re-type the login name 371 and password 372 prior to sending each command 380. As known to those skilled in the art, a session is a series of interactions between two communication end points that occur during the span of a single connection. Typically, one end point requests a connection with another specified end point and if that end point replies and agrees to the connection request, then the end points take turns exchanging commands and data (i.e., "talking" to each other). The session begins when the connection is established at both ends and terminates when the connection is ended.

Therefore, the features discussed with reference to FIG. 3 solve the previous problem where a resource group administrator was not able to add objects to a resource group that he/she owns. All resource group administrators trying to add managed objects to their resource group would be required to provide a permission 365 which is required to match a permission 377 that is stored in a network resource 310(3). The access control software thread 375 then authenticates this provided permission 365 by comparing this provided permission 365 with the permission 377 in the network resource 310(3). If the provided permission 365 was successfully authenticated, then the add managed object software thread 380 will add a copy of the global object 335 as a managed object in table 340 that is associated with the resource group 305. Note also that permission 377 in the network resource 310(3) is usually known only with an administrator of the network resource 310(3) and is not public information. Therefore, this permission 377 ensures that only a resource group administrator who is a legitimate administrator of the network resource 310(3) can add the object 360 to the table 340 which is associated with the resource group(s) that he/she owns. Additionally, a resource group administrator with the proper permission 365 can add the object for network resource 310(3) to the table 340 that represents his/her resource group 305 and advantageously avoid the previous requirement of requesting the global administrator to actually add that object to the table 340.

Configuration information for network resources may be stored in a network management product such as, for example, the above-mentioned DataFabric Manager product. The configuration information are also global objects in the global groups and are referred to as "configuration objects". These configuration objects may be attached to one or more resource groups by a resource group administrator. However, only administrators with global permissions (i.e., global administrators) are permitted to edit the configuration objects. The reason for this access restriction is because any change to this configuration object will change the configuration information that gets pushed (and stored) to all the network resources (e.g., storage appliances or/and network caches) that belong to the resource groups to which this configuration object is attached. Therefore, if a resource group administrator is allowed to edit a configuration object, then he/she can potentially change the configuration for network resources (e.g., storage appliances or/and network caches) over which he/she does not have any access permission. In other words, the modified configuration will be pushed to all resource groups in which the configuration object is attached, regardless of whether or not the resource group administrator owns a resource group in which the configuration object is attached. This modified configuration is then pushed to all network resources that belong to these resource groups. As a result, the configuration information in at least some of the network resources are improperly modified. On the other hand, due to the above-mentioned access restriction, a resource group administrator (who has legitimate access permissions to a resource group) will not be able to edit the configuration that gets pushed to a network resource(s) (e.g., storage appliance or/and network cache) in a resource group(s), even if the configuration object was attached to only his/her resource groups(s). As a result, the resource group administrator is inconveniently required to request the global administrator to edit the configuration object so that the edited configuration is pushed and stored in the network resources in his/her resource group(s). Therefore, there is a need for a new additional approach that will permit a resource group administrator (with a resource group level permission but without a global permission) to edit the configurations that are attached to his/her resource group(s) without requiring a global permission.

Figure 4:
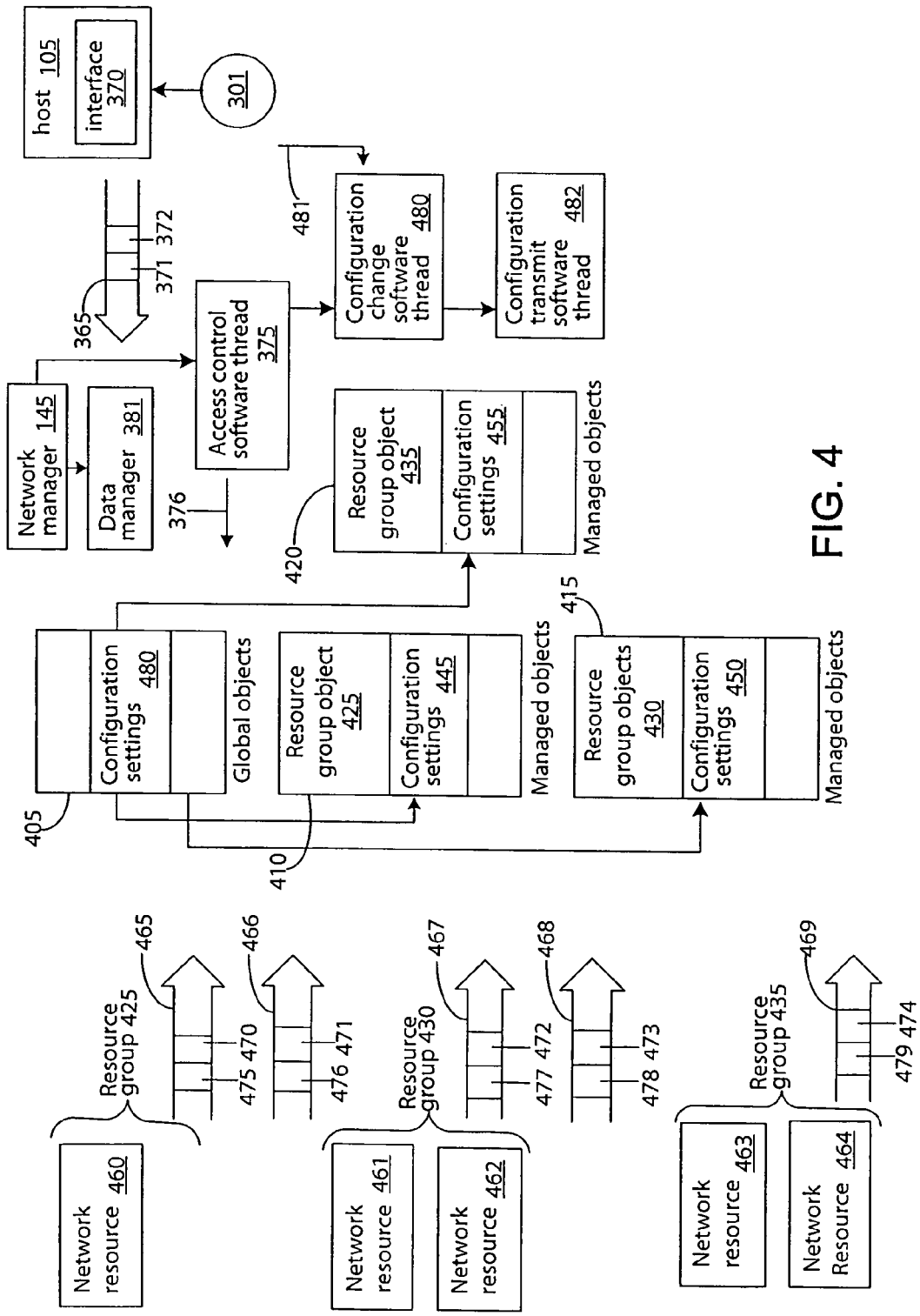
FIG. 4 is a block diagram that shows additional details of another embodiment of the invention.

FIG. 4 is a block diagram that shows additional details of another embodiment of the invention for providing a solution to the problem discussed above. Table 405 includes global objects which include one or more configurations settings 410 that are set in network resources. Examples of configuration settings include the domain name server (DNS) names that are assigned to each network resources. Configuration settings may also include software that is added to the network resources or software updates that are pushed to the network resources. Those skilled in the art will realize that numerous types of configuration settings are used in a network resource.

Tables 410, 415, and 420 are associated with resource groups 425, 430, and 435, respectively. The configuration settings 440 in table 405 are attached to the tables 410, 415, and 420. Therefore, the configuration settings 445, 450, and 455 in the tables 410, 415, and 420, respectively, will be identical to the configuration settings 440 in table 405. Additionally, any change in the configuration settings 440 will also be made in the configuration settings 445, 450, and 455. The above-discussed data manager 381 will perform any change in the configuration settings 440 to the configurations settings 445, 450, and 455. As an example, if the tables 405, 410, 415, and 420 are implemented as standard linked lists, the data manager 381 can perform any change in the configuration settings 440 to the configurations settings 445, 450, and 455 by use of linked list data duplication that are well known to those skilled in the art.

In one example, assume that the resource group manager 301 is an owner of the resource groups 425, 430, and 435. As similarly discussed above, the resource group manager sends, via interface 370, a resource group level permission 365. As also discussed above, the permission 365 includes, for example, a login name 371 and/or password 372 that are unique to the resource group administrator 301.

The access control software thread 375 of the network manager 145 receives the permission 365 and transmits a query 376 to each network resource in the resource groups 425, 430, and 435. In response to the query 376, the network resources 460-464 send responses indicating the permissions in the network resources 460-464. For example, the network resources 460-464 have the permissions 465-469, respectively. As mentioned above, a permission is typically stored in a memory in a network resource and the response with the permission is transmitted to the network manager 145 by, for example, a processor 103 in the network resource 310(3) if the network resource 310(3) is a storage appliance 115 (FIG. 1) or a controller in the network resource 310(3) if the network resource 310(3) is a network cache 125 (FIG. 1). The permissions 465-469 can also include the login names 470-474, respectively, and/or passwords 475-479, respectively.

If the access control software thread 375 determines that there is a match between the permission 365 and each of the permissions 465-469, then the resource group administrator 301 is an owner of each of the resource groups 425-435. As a result, a configuration change software thread 481 can process a change configuration settings commands 481 via interface 370 from the resource group administrator 301. These commands 481 permit the resource group administrator 301 to change configuration settings in the global object 440. For example, the commands 481 permit a DNS server name to be changed for any network resource in the resource groups 425-435. As another example, the commands 481 will add a software or add a software updates for any of the network resources in the resource groups 425-435. In response to these commands 481, the access control software thread 375 permits the configuration change software thread 480 to change the appropriate values in the objects 440. The data manager 381 then changes the objects 445, 450, and 455 that are attached to the object 440, so that the objects 445, 450, and 455 will also have the configuration settings change(s) that were made to the global object 440. The configuration transmit software thread 482 then transmits the changed (updated) configuration settings 445, 450, 455, to network resources in the resource groups 425, 430, and 435, respectively. Therefore, the above matching of the permission 365 with each of the stored permissions 465-469 will given the resource group administrator an access ability to change or/and update the configuration settings in the network resources in the groups 425, 430, and 435. Methods for updating the configuration settings in a network resource are well known to those skilled in the art. For example, a network resource (e.g., network resource 460) is a storage appliance 115 (FIG. 1), then the update configuration settings 445 is received by the network adapter 106 (FIG. 1) and stored in memory 104 by the storage operating system 112 and used during the operation of the storage appliance 115. Other known methods for pushing and storing the changed (updated) configuration settings to network resources may also be used and are not described further for purposes of focusing the discussion on features of the invention.

Note that if at least any one of the permissions 465, 466, 467, 468, and 469 does not match the permission 365, then the access control software thread 375 will not permit a personnel to change the configuration settings 440. Therefore, the access control software thread 375 will block and prevent the processing of the configuration settings change commands 481. Therefore, the personnel will not be able to make any changes to the global object 440. As a result, no changes are made to the objects 445, 450, and 455, and no configuration settings changes are pushed to the network resource in the resource group 425, 430, and 435.

If at least one of the permissions 465, 466, 467, 468, and 469 does not match the permission 365 that is provided by a resource group administrator 301, then that resource group administrator is deemed to not own the resource group with the permission(s) that does not match the provided permission 365. For example, assume that the permission 465 does not match the provided permission 365, but the permissions 466-467 (in resource group 430) and permissions 468-469 (in resource group 435) matches the provided permission 365, then the resource group administrator 301 owns the resource groups 430 and 435 but does not own the resource group 425. Therefore, the resource group administrator 301 should not be permitted to change the configuration settings in the network resource 460 in the resource group 425 that he/she does not own. In an embodiment of the invention, in response to a mismatch between the provided permission 365 and any one of the permissions 465-469 in the resource groups, the access control software thread 375 blocks the command 481 and therefore prevents any changes to the global object 440, as discussed above. As a result of preventing changes to the global object 440, changes to the attached objects 445-455 are also prevented. Therefore, unauthorized configuration changes are not pushed to any of the resource groups 425-435. As also similarly discussed above, the permissions 365 and 465-469 can be based on login identifiers and/or passwords, or based on biometrics information.

Therefore, an embodiment of the invention solves the problem of a resource group administrator not previously being able modify a configuration setting that is attached to his/her resource group. The access control software thread 375 would allow a resource group administrator 301 to edit a configuration settings object 440 that is attached to his/her resource group if and only if the administrator has permissions over all resource groups to which the configuration settings object is attached to. If, however, the configuration settings object was attached to any resource group over which the administrator 301 does not have sufficient permission over (i.e., is not owned by the administrator 301), even if the administrator 301 owns other resource groups that are attached to the configuration settings object, the access control software thread 375 will prevent the administrator 301 to edit that configuration settings object. This method of access control ensures that the administrator can only modify the configuration settings on network resources (e.g., storage appliances or network caches) that he/she has access permissions.

Adding objects to a resource group and editing configuration objects in the global group are operations that were not permitted to a resource group administrator in a previous network manager product (e.g., DataFabric Manager) because of the above discussed security considerations. As a result, in previous network manager products, only administrators with global permission (i.e., global administrators) can perform the above-mentioned operations. This access restriction causes serious inconvenience to the resource group administrators, as discussed above. Also, the global administrators end up performing the above operations for resource group administrators which, in turn, reduces the effectiveness of the network manager product. Therefore, the above-discussed access control methods in accordance with the embodiment of the invention overcome the above-discussed disadvantages.

An embodiment of the invention also increases the flexibility of a network manager (e.g., the above-mentioned DataFabric Manager product) by allowing resource group administrators to add managed objects to their resource group and edit configuration objects that are attached to their resource group without compromising security. The access control method discussed above on the comparisons of permissions provide sufficient security that prevents unauthorized additions of managed objects and unauthorized modifications of global objects as discussed above.

It is also within the scope of an embodiment of the present invention to implement a program or code that can be stored in a machine-readable medium to permit a computer to perform any of the methods described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computer-implemented method of providing ability to access a network resource for a plurality of resource group administrators, the method comprising:
adding a network resource in a network storage architecture to a resource group of a resource group administrator of the plurality of resource group administrators, wherein the resource group administrator does not have administrative authority over the network resource;
obtaining from the network resource a resource permission for the network resource, the resource permission stored in the network resource;
authenticating a resource group level permission of the resource group administrator in order to determine if the resource group administrator is to be given the ability to access the network resource, wherein said authenticating includes comparing the resource group level permission of the resource group administrator with the resource permission; and
upon successfully authenticating the resource group level permission, permitting the resource group administrator to add a copy of an object of the network resource to a managed objects structure of the resource group administrator, wherein only objects in the managed objects structure of the resource group administrator are accessible by the resource group administrator.

2. The method of claim 1, further comprising:
forwarding commands from the resource group administrator to the network resource.

3. The method of claim 1, further comprising:
if the resource group level permission is not successfully authenticated, then preventing the resource group administrator from accessing the network resource.

4. The method of claim 3, further comprising:
blocking commands from the resource group administrator to the network resource.

5. The method of claim 1, wherein the resource group level permission comprises at least one of a login name and a password.

6. The method of claim 1, wherein the network resource comprises one of: a storage appliance, network cache, aggregate, volume, or qtree.

7. An apparatus for providing an ability to access a network resource for a plurality of resource group administrators, the apparatus comprising:
a network interface through which to communicate over a network; and
a network manager configured to authenticate a resource group level permission of a resource group administrator of the plurality of resource group administrators, in order to determine if the resource group administrator is to be given the ability to access a network resource in a network storage architecture that is added to a resource group of the resource group administrator, wherein the network manager is configured to query the network resource over the network through the network interface for a resource permission for the network resource, the resource permission stored in the network resource, upon receiving the resource group level permission from the resource group administrator, wherein the resource group administrator does not have administrative authority over the network resource, and to compare the resource group level permission of the resource group administrator, with the resource permission, and further upon successfully authenticating the resource group level permission, permitting the resource group administrator to add a copy of an object of the network resource to a managed objects structure of the resource group administrator, wherein only objects in the managed objects structure of the resource group administrator, are accessible by the resource group administrator.

8. The apparatus of claim 7, wherein the network manager forwards commands from the resource group administrator to the network resource.

9. The apparatus of claim 7, wherein if the resource group level permission is not successfully authenticated, then network manager prevents the resource group administrator from accessing the network resource.

10. The apparatus of claim 9, wherein the network manager blocks commands from the resource group administrator to the network resource.

11. The apparatus of claim 7, wherein the resource group level permission comprises at least one of a login name and a password.

12. The apparatus of claim 7, wherein the network resource comprises one of: a storage appliance, network cache, aggregate, volume, or qtree.

13. A non-transitory computer-readable medium having stored thereon instructions to:
query a network resource in a network storage architecture for a resource permission for the network resource, the resource permission stored in the network resource, upon receiving a resource group level permission from a resource group administrator of a plurality of resource group administrators for authenticating access to the network resource, wherein the resource group administrator does not have administrative authority over the network resource;

compare the resource group level permission of the resource group administrator to the resource permission in order to determine if the resource group administrator is to be given an ability to access a network resource that is added to a resource group of the resource group administrator; and in response to matching the resource group level permission to the resource permission, permitting the resource group administrator to add a copy of an object of the network resource to a managed objects structure of the resource group administrator, wherein only objects in the managed objects structure of the resource group administrator are accessible by the resource group administrator.

14. A computer-implemented method of providing an ability to access a network resource for a plurality of resource group administrators, the method comprising:

upon receiving a resource group level permission from a resource group administrator of the plurality of resource group administrators for authenticating access to a plurality of network resources in a network storage architecture across a plurality of resource groups, querying each of the plurality of network resources for a resource permission stored in the corresponding network resource, wherein the resource group administrator does not have administrative authority over the network resource; and comparing the resource group level permission of the resource group administrator with the resource permission of each network resource across the plurality of resource groups in order to determine if the resource group administrator is to be given an access ability to modify configuration settings in any network resource in the resource groups; and in response to matching the resource group level permission to the resource permission of each network resource, permitting the resource group administrator to modify configuration settings in a global objects set to allow the resource group administrator to modify configuration settings in the network resources in the plurality of resource groups, wherein the global objects set includes the plurality of network resources.

15. The method of claim 14, further comprising:

if the resource group level permission is not successfully authenticated, then preventing the administrator to modify the configuration setting in any network resource in the resource groups.

16. The method of claim 14, wherein the resource group level permission comprises at least one of a login name and a password.

17. The method of claim 14, wherein the network resource comprises one of: a storage appliance, network cache, aggregate, volume, or qtree.

18. An apparatus for providing an ability to access a network resource for of a plurality of resource group administrators, the apparatus comprising:

a network interface through which to communicate over a network; and a network manager configured to authenticate a resource group level permission of the resource group administrator across a plurality of resource groups in order to determine if the resource group administrator is to be given an access ability to modify configuration settings in any network resource in a network storage architecture in the resource groups, wherein the network manager is configured to query each network resource across the plurality of resource groups through the network interface for a resource permission for each network resource, each said resource permission stored in the corresponding network resource, upon receiving the resource group level permission from the resource group administrator; compare the resource group level permission of the resource group administrator to the resource permission of each network resource wherein the resource group administrator does not have administrative authority over the plurality of resource groups; and in response to matching the resource group level permission to the resource permission of each network resource, permit the resource group administrator to modify configuration settings in a global objects set to allow the resource group administrator to modify configuration settings in the network resources in the plurality of resource groups, wherein the global objects set includes the plurality of network resources.

19. The apparatus of claim 18, wherein if the resource group level permission is not successfully authenticated, then network manager prevents modification of the configuration setting in any network resource in the resource groups.

20. The apparatus of claim 18, wherein the resource group level permission comprises at least one of a login name and a password.

21. The apparatus of claim 18, wherein the network resource comprises one of: a storage appliance, network cache, aggregate, volume, or qtree.

22. A non-transitory computer-readable medium having stored thereon instructions to:

query each of the plurality of network resources in a network storage architecture across a plurality of resource groups for a resource permission for each network resource stored in each network resource upon receiving a resource group level permission from a resource group administrator of a plurality of resource group administrators for authenticating access to the plurality of network resources, wherein the resource group administrator does not have administrative authority over the plurality of network resources;

upon receiving a resource group level permission from the resource group administrator for authenticating access to a plurality of network resources across a plurality of resource groups, query each of the plurality of network resources for a resource permission stored in the corresponding network resource; and compare the resource group level permission of the resource group administrator to the resource permission of each of the network resources across the plurality of resource groups in order to determine if the resource group administrator is to be given an access ability to modify configuration settings in the plurality of network resources in the resource groups in response to matching the resource group level permission of the resource permission of each of the network resources, permitting the resource group administrator to modify configuration settings in a global objects set to allow the resource group administrator to modify configuration settings in the network resources in the plurality of resource groups, wherein the global objects set includes the plurality of network resources.

23. A computer-implemented method for providing an access ability to a network resource, the method comprising:

adding an object of a network resource in a network storage architecture into a global object set;

obtaining from the network resource a resource permission for the network resource, the resource permission stored in the network resource;

authenticating a resource group level permission of a resource group administrator of a plurality of resource group administrators, wherein the resource group administrator does not have administrative authority over the network resource, wherein said authenticating includes comparing the resource group level permission of the resource group administrator with the resource permission; and in response to a successful authentication of the resource group level permission, allowing the resource group administrator to copy the object to a managed objects set that belongs to the resource group administrator so that the administrator can access the network resource.

24. The method of claim 23, wherein objects are added to the global objects after successful authentication of a global permission which provides a broader privilege than the resource group level permission.

25. The method of claim 23, further comprising:
if the resource group level permission is not successfully authenticated, then preventing the object to be copied to the managed objects set.

26. The method of claim 23, wherein the network resource comprises one of: a storage appliance, network cache, aggregate, volume, or qtree.

27. A computer-implemented method of providing an access ability to a network resource, the method comprising:
upon receiving a resource group level permission from a resource group administrator of a plurality of resource group administrators for authenticating access to a plurality of network resources in a network storage architecture across a plurality of resource groups, querying each of the plurality of network resources for a resource permission stored in the corresponding network resource, wherein the resource group administrator does not have administrative authority over the plurality of network resources;

comparing the resource group level permission of the resource group administrator to the resource permission of each of the network resources across the plurality of resource groups; and in response to a successful authentication of the resource group level permission across the plurality of resource groups, permitting the resource group administrator to modify configuration settings in a global objects set to allow the resource group administrator to modify configuration settings in the network resources in the plurality of resource groups, wherein the global objects set includes the plurality of network resources.

28. The method of claim 27, further comprising:
in response to the modification of configuration settings in the global objects set, modifying configuration settings in manage objects sets that are associated with the resource groups.

29. The method of claim 27, further comprising:
if the resource group level permission is not successfully authenticated, then preventing the modification of the configuration settings in the global objects set.

30. The method of claim 27, wherein the resource group level permission comprises at least one of a login name and a password.

31. The method of claim 27, wherein the network resource comprises one of: a storage appliance, network cache, aggregate, volume, or qtree.

* * * * *